3,488,390
PRODUCTION OF HEXAMETHYLENE DIAMINE
Beverley Carss and David Morgan Leyshon, Manchester, England, assignors to Imperial Chemical Industries Limited, London, England, a corporation of Great Britain
No Drawing. Filed Jan. 17, 1966, Ser. No. 520,854
Claims priority, application Great Britain, Jan. 20, 1965, 2,548/65
Int. Cl. C07c 85/12, 87/14
U.S. Cl. 260—583    4 Claims

ABSTRACT OF THE DISCLOSURE

A continuous process for producing hexamethylene diamine which comprises introducing into a mixture of ammonia and hydrogen a liquid phase consisting of adiponitrile in which is dissolved water in a proportion of from 2% by weight up to the saturation point at 50° C., contacting the resultant gas-liquid mixture with a cobalt catalyst in a hydrogenation zone wherein the starting temperature is 80–100° C. and the finishing temperature is 120–150° C. and the pressure is 200–500 atmospheres, removing liquid and gaseous products from the hydrogenation zone and freeing the liquid product from dissolved ammonia.

---

This invention relates to the manufacture of hexamethylene diamine.

Hexamethylene diamine is made on the large scale as an intermediate for the manufacture of nylon usually by the liquid phase hydrogenation of adiponitrile. The hydrogenation is conducted continuously under pressure at elevated temperature by mixing adiponitrile with a large excess of ammonia and hydrogen, and passing the mixture through a catalyst bed usually composed of copper, nickel or cobalt with or without a support.

In the continuous hydrogenation of adiponitrile to hexamethylene diamine employing a cobalt catalyst it has now been found advantageous to employ an adiponitrile feed containing dissolved water.

Thus according to the present invention we provide a continuous process for the manufacture of hexamethylene diamine by the hydrogenation of adiponitrile with a mixture of hydrogen and ammonia at elevated temperature and pressure in presence of a cobalt catalyst wherein the adiponitrile employed as starting material contains dissolved water in the proportion of from 2% by weight up to saturation concentration at 50° C.

Preferably the adiponitrile and water are introduced into the hydrogenation zone as a homogeneous liquid phase, and in order for this to be done it may be necessary to maintain the wet adiponitrile at a temperature of up to about 50° C. during storage before it is introduced into the hydrogenation zone. It is preferred not to exceed a water content of about 10%.

In the process of the invention the adiponitrile containing dissolved water is preferably hydrogenated at a starting temperature of about 80°–100° C. to a finishing temperature of 120°–150° C. Pressures of 200–500 atmospheres may advantageously be employed. Suitable ratios of ammonia to adiponitrile are from 22 mols. to 52 mols. of ammonia per mol. of adiponitrile. Hydrogen is employed in excess. The preferred catalyst is a reduced cobalt oxide catalyst.

Surprisingly it is found that the inclusion of water in the adiponitrile feed has the effect of reducing impurities in the product. This result is of commercial importance, for in the manufacture of nylon it is necessary to use highly pure hexamethylene diamine and savings in purification costs are very significant.

The invention is illustrated by the following example.

EXAMPLE

Adiponitrile containing 6% by weight of water was stored at 40–50° C. prior to use to prevent separation of water. For hydrogenation a flow of 1,410 lb./hr. of the aqueous adiponitrile (1,325 lb./hr. water free) was injected continuously into a preheated stream consisting of 6,600 lb./hr. of liquid ammonia and 60,000–65,000 cu. ft./hr. of hydrogen at a pressure of 250 atmospheres.

The ammonia/hydrogen/water/adiponitrile mixture was passed through a bed of reduced cobalt oxide catalyst, the inlet feed temperature being adjusted to give a final reaction temperature of 125°–140° C. The reaction products were cooled to 30°–40° C. and the ammonia distilled from the liquid phase after pressure reduction. The ammonia-free product contain 6% water, 91.5% hexamethylene diamine and 2.5% other products.

When the process described in this example was repeated using dry adiponitrile the product contained 97.3% of hexamethylene diamine and 2.7% of other products.

The conditions specified in this example may be varied within the limits indicated in the preceeding paragraphs of this specification. In particular any catalyst containing cobalt as the effective ingredient may be employed. Thus the catalysts described in U.K. Patent No. 758,426 are effective. The reduced cobalt oxide catalyst used in the experiment which we have specifically described in this example was obtained by the procedure described in the example of U.K. Patent No. 759,426 but contained no promoter.

We claim:
1. A continuous process for the manufacture of hexamethylene diamine which process comprises introducing into a mixture of ammonia and hydrogen a liquid phase consisting of adiponitrile in which is dissolved water in a proportion of from 2–10% by weight, contacting the resultant gas-liquid mixture with a cobalt catalyst in a hydrogenation zone wherein the starting temperature is 80°–100° C. and the finishing temperature is 120°–150° C. and the pressure is 200–500 atmospheres, removing liquid and gaseous products from the hydrogenation zone and freeing the liquid product from dissolved ammonia.
2. Process according to claim 1 wherein from 22 to 52 mols. of ammonia per mol. of adiponitrile are used.
3. Process according to claim 1 wherein a reduced cobalt oxide catalyst is employed.
4. Process according to claim 2 wherein a reduced cobalt oxide catalyst is employed.

References Cited

UNITED STATES PATENTS 2,504,024    4/1950    Howk et al. _____ 260—583

CHARLES B. PARKER, Primary Examiner

C. F. WARREN, Assistant Examiner

U.S. Cl. X.R.
260—690